United States Patent [19]
Nilsen

[11] Patent Number: 5,780,140
[45] Date of Patent: Jul. 14, 1998

[54] RETROREFLECTIVE MICROPRISMATIC MATERIAL WITH TOP FACE CURVATURE AND METHOD OF MAKING SAME

[75] Inventor: Robert B. Nilsen, Wheatogue, Conn.

[73] Assignee: Reflexite Corporation, Avon, Conn.

[21] Appl. No.: 717,597

[22] Filed: Sep. 23, 1996

[51] Int. Cl.[6] ............................................. B32B 3/00
[52] U.S. Cl. ........................... 428/172; 40/612; 2/244; 156/242; 264/1.1; 264/1.38; 264/1.9; 264/241; 404/9
[58] Field of Search ............................. 428/167, 172, 428/174; 156/60, 196, 242; 264/239, 241, 1.1, 1.38, 1.9, 167; 72/462; 40/612, 616, 9.3; 116/42, 35 R; 2/243.1, 244, 245

[56] References Cited

U.S. PATENT DOCUMENTS

| | | | |
|---|---|---|---|
| 3,689,346 | 9/1972 | Rowland | 156/245 |
| 3,716,445 | 2/1973 | Lemelson | 428/167 |
| 4,244,683 | 1/1981 | Rowland | 425/143 |
| 4,801,193 | 1/1989 | Martin | 350/103 |
| 5,171,624 | 12/1992 | Walter | 428/156 |
| 5,204,160 | 4/1993 | Rouser | 428/167 |
| 5,229,882 | 7/1993 | Rowland | 358/530 |
| 5,300,263 | 4/1994 | Houpman et al. | 264/2.5 |

FOREIGN PATENT DOCUMENTS

WO 94/09974   5/1994   WIPO .

*Primary Examiner*—Donald Loney
*Attorney, Agent, or Firm*—Hamilton, Brook, Smith & Reynolds, P.C.

[57] ABSTRACT

Retroreflective material is disclosed which is formed of an array of microprisms which reflect light more uniformly by forming a concave curvature in the base face of the prisms.

18 Claims, 5 Drawing Sheets

RETROREFLECTIVE MICROPRISMATIC MATERIAL WITH TOP FACE CURVATURE AND METHOD OF MAKING SAME

BACKGROUND OF THE INVENTION

Retroreflective sheet material is widely employed for a variety of safety and decorative purposes, and is particularly useful when the need for night time visibility is significant under conditions of low ambient light. In retroreflective materials, the light rays impinging upon the front surface are reflected back towards the source of the illumination. In situations where headlights or search lights on boats and aircraft are the only source of illumination, this ability to retroreflect in a controlled cone the bulk of the rays falling thereon is especially significant for warning signs, delineators and the like.

Applicant's assignee, Reflexite Corporation, has been marketing under the trademark REFLEXITE®, reflective sheeting employing microprism formulations to produce such retroreflection. Illustrative of such materials is Rowland U.S. Pat. No. 3,689,346 granted Sep. 5, 1972, the teachings of which are incorporated herein by reference in their entirety.

Among the applications for such retroreflective materials are reflective tapes and patches for clothing, reflective vests and belts, bands for posts and barrels, traffic cone collars, highway signs, warning reflectors and the like.

Figure 1:
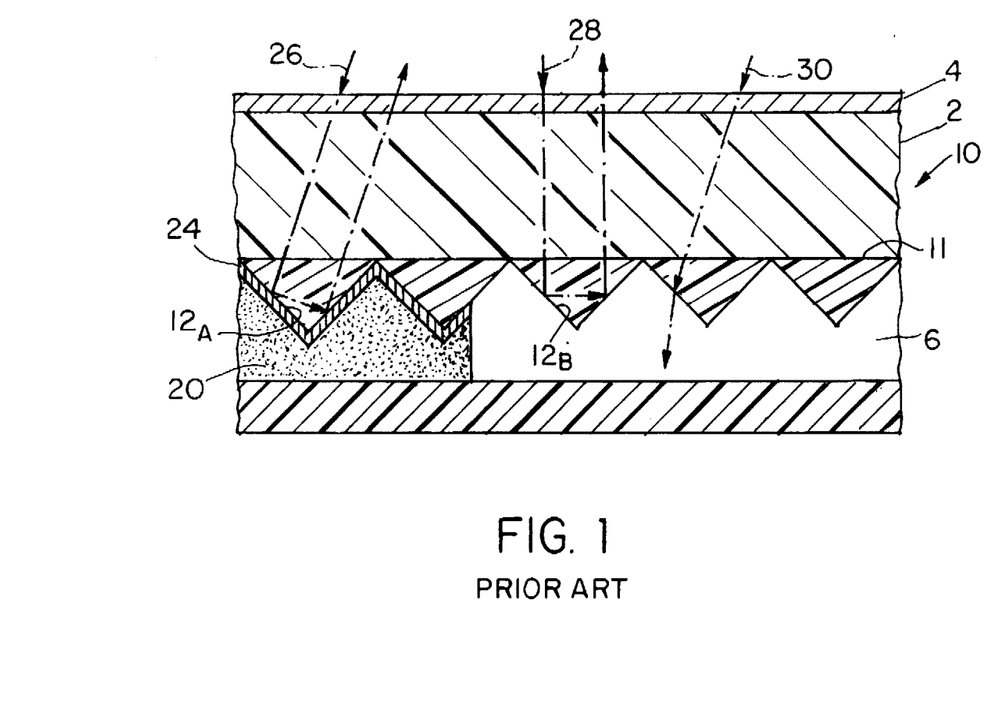
FIG. 1 is a fragmentary sectional view of a prior art retroreflective sheeting showing a partially metalized and partially air backed structure and illustrating diagrammatically the path of typical light rays incident thereon.

Typical prior art retroreflective sheeting 10 is formed of cube-corner prisms having a flat base face 11 abutting a carrier film 2 protected by a coating layer 4 as shown in FIG. 1.

As is known, the three reflecting adjacent surfaces of a cube corner prism rotate the direction of the incoming light 26 or 28 by an angle of 180°, and the light exits parallel to the incident direction. Retroreflection of light rays entering the prisms may be seen in FIG. 1 wherein a reflective metal deposit 24 is shown on some of the prisms 12A while an air interface is shown for other prisms 12B. A light ray 26 entering the front or base face of the sheeting 10 and entering the prism 12A is reflected (by the interface of the prism material with the metallic coating 24) to another face of the prism (and again reflected to the third face of the prism, although not so illustrated). Ultimately, the ray 26 is redirected from the prism 12A towards the front face of the sheeting 10 from which it exits in a path substantially parallel to the incident ray. Similarly, the light ray 28 is redirected by the prism 12B/air 6 interface at the prism into which it passes. A light ray 30 entering the sheeting 10 at a steep angle will not be reflected by the prism/air interface.

Figure 2:
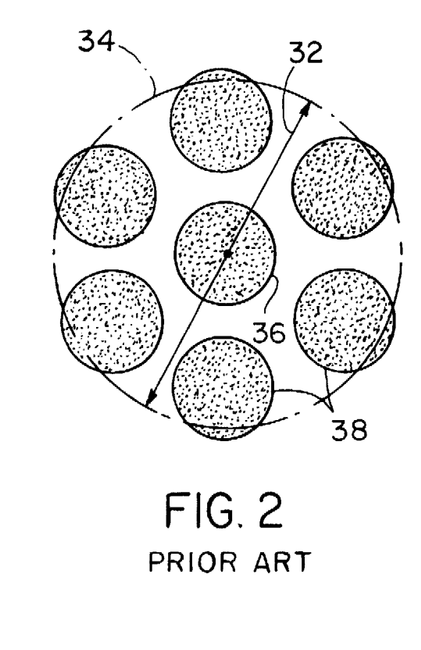
FIG. 2 is a typical retroreflected energy pattern generated by the prior art microprism sheeting of FIG. 1 when the prisms are about 0.006 inch on centers.

Turning now to FIG. 2, taken from U.S. Pat. No. 5,171,624 to Walter (incorporated herein in its entirety by reference, therein illustrated is the effect of diffraction of the exit energy pattern in a microprism sheeting of the prior art in which the prisms are 0.006 inch on centers. The center of the energy pattern (primary maximum) is designated by the numeral 32 and the circumference of the 0.5° exit cone is designated by the numeral 34. The exit energy is concentrated in the zero-order primary maximum 36 and in the six radially and circumferentially spaced areas (secondary maxima) 38 with an area of low energy level there between. This area of low energy distribution is undesirable because of the high degree of variation in energy level throughout the cone.

SUMMARY OF THE INVENTION

In accordance with the invention, a more even distribution of the diffractive energy pattern may be achieved in reflective prism or microprism structures by introducing a curvature in the previous flat base face of each of the prism structures. Preferably the curvature is concave and forms a miniature lens or lenslet at the interface between the base face and any overlying protective covering. In a preferred embodiment, the curvature is formed by bonding rigid transparent heat-shrinkable dielectric prism arrays (preferably formed of a UV cured acrylate epoxy material) to a malleable planar film, such as a vinyl film (formed of e.g. 34% plasticizer/66% PVC), with the base faces of the prisms abutting the planar film surface. Preferably, the array is bonded to the film with a heat curable adhesive/release coat. As the prism array material is cured, the prisms shrink in a controlled manner creating the desired concave face surface and pulling the film down into the void created thereby.

Preferably, after bonding the prism array to the malleable film, the bonded composite is removed from the mold, exposing the facet sides of the prisms which are then coated with a reflective material, such as metal. Alternatively, an air-gap interface may be employed for reflectivity as is well known.

The degree of concave curvature can be controlled by varying the hardness of the malleable film using more or less plasticizer. The harder the film, the less curvature, also; the less plasticizer, the harder the film.

The invention also includes a method for forming an embossing roll to apply a suitable lenslet surface to the base faces of a prism array. In this aspect of the invention, a replica of the prism array, formed as above with curved face surfaces, is electroformed and used to form a large embossing tool. The embossing tool is then used to emboss or cast the curved surfaces onto a top film. The curved surfaces are located randomly in such a way that some curved surfaces always line up properly with the center of the prism base faces.

DETAILED DESCRIPTION OF PREFERRED EMBODIMENT OF THE INVENTION

As previously indicated, the sheeting of the present invention employs closely spaced microprisms which have their base faces formed with a relatively shallow curvature. As a result, the prisms of the sheeting redirect light energy to produce retroreflection of most of the light entering the prisms within a narrow cone of divergence and in a manner which minimizes the regions of low power within that cone.

The term "retroreflective sheeting" as used herein refers to relatively thin sheet-like structures as well as thicker members, laminates and the like, which have a substantially planar front cover face upon which light rays impinge and which have a prism array portion which is essentially transparent to the light rays and is backed by a reflective interface.

Referring now to FIGS. 3A–3E, the invention will now be described in detail in connection therewith. Since much of the apparatus and processes used in connection with manufacturing the embodiments herein has been previously described in connection with the above-referenced U.S. Pat. No. 3,689,356, such details will not be repeated here except where needed for a proper understanding of the present invention.

The method of the invention includes providing a molding drum 53 (FIG. 3A) mounted upon an axle or shaft for rotation in the direction indicated by the arrow (i.e., counterclockwise). The circumferential portion of the drum 53 consists of a multiplicity of metallic plates 55 bonded to a circumferential base portion. Each of the plates 55 is formed with a multiplicity of identical, contiguously arranged cube-corner recesses or indentations 57 and the plates 55 are provided entirely about the circumference of the drum 53 to provide a molding surface that has a substantially continuous array of cube-corner recesses 57 therein.

A coating head 61 (FIG. 3B) is mounted about the drum at one point about its circumference for reciprocal movement thereacross. As the drum continuously rotates, a hard-enable molding material 58 in fluid form is deposited thereupon from the coating head 61. Film 63 is continuously withdrawn from a feed reel (not shown) and applied against the drum 53 by a pressure roll 59, which cooperates with the drum 53 to provide a nip at which the hardenable material 58 is uniformly distributed over the surface of the mold plates 55, and at which intimate contact is effected between the material 58 and the film 63.

Figure 3A:
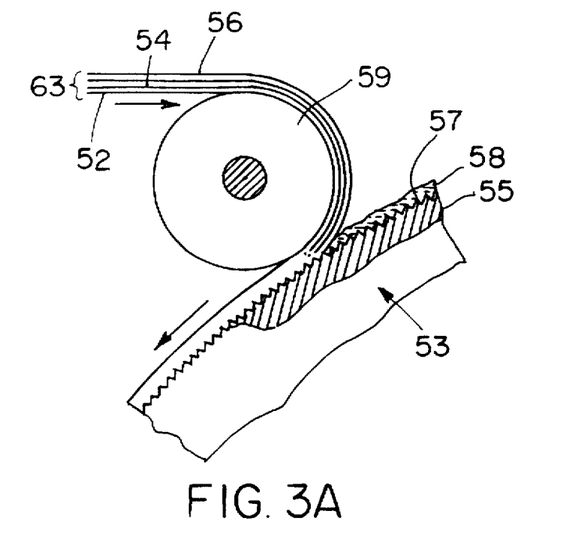
FIGS. 3A–3E are a series of sectional views of steps in the process of making the microprism retroreflective sheeting of the invention.
Figure 3B:
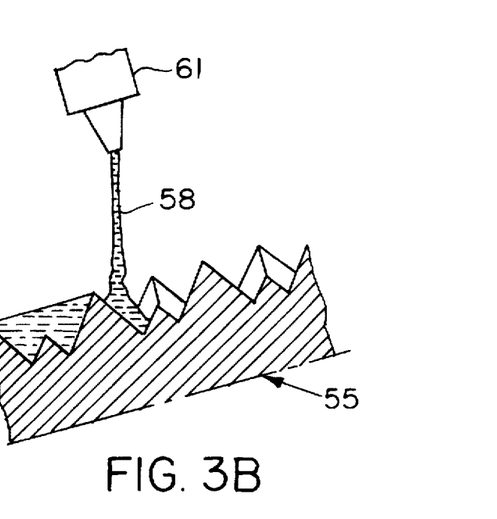

Film 63 is comprised of a lamination of an adhesive and two films; an optional outer transparent film 52 (which appears to provide a more uniform laminating roll pressure distribution); an adhesive 56; and a top film 54. Adhesive 56 may comprise a heat sensitive (UV curable) tie-coat Bostic® 7650 adhesive.

The freshly applied material 58 and film 63 travel together past a bank of UV radiating elements (not shown) whereat hardening of the material 58 and bonding thereof to the film 63 are concurrently effected. Thereafter, a cooling medium permanently sets the material 58 which now is bonded to the film 63 so that the composite laminated structure 65 of FIG. 3C can be readily stripped from the drum 53.

The top film 54 is formed of plastic material, such as, vinyl which is relatively hard but malleable. Film 53 is laminated to prism array 50 by the process previously described in connection with FIG. 3B. The prism base facets or windows 51 are opposite the planar surface of the top film 54.

Figure 3C:
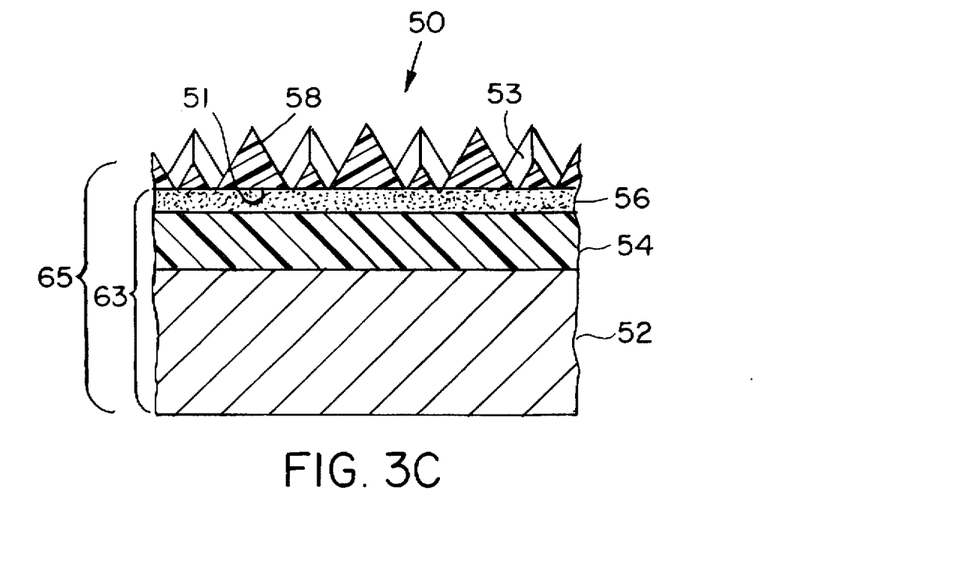

Upon removal of the laminated structure 65 of FIG. 3C from the mold; the exposed prism sides or facets 53 are preferably coated with a reflective coating 60, such as, a metallic coating of aluminum. (FIG. 3D).

Figure 3D:
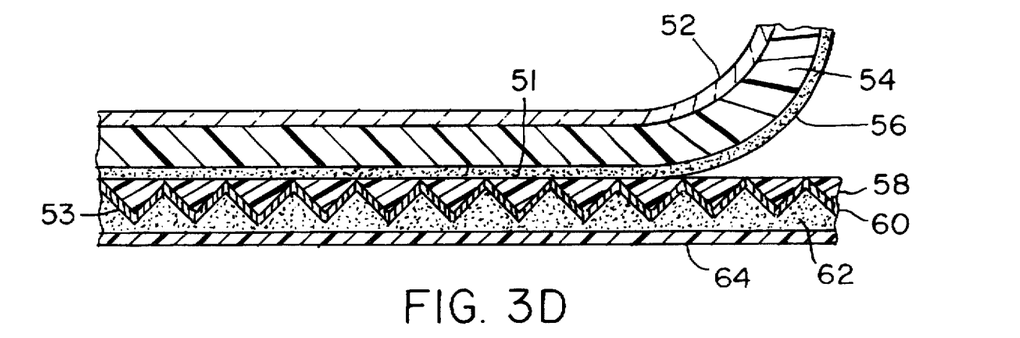

Next as also shown in FIG. 3D, a pressure sensitive adhesive, such as Coating Sciences, Inc. CSI-UP509, is applied at 150° F. for about a five second dwell time, or a heat activated (HAA) adhesive 62, such as Xyro Puro-H, is applied to the facet side of the array 50. A temporary release layer 64 of e.g., silicone treated paper or polyethylene teraphthalate (PET) is then applied to the adhesive 62.

Figure 3E:
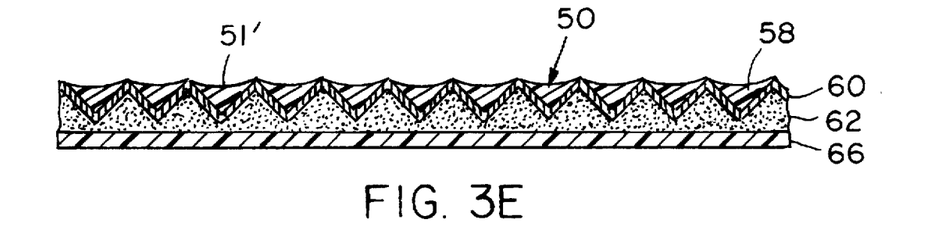

After curing, the top film 54 and optional carrier 52 are carefully stripped from the array 50 by pulling the film back from the prism base faces or windows 51 at an angle of 180 degrees (or parallel to the prism base faces 51) in a slow and steady manner. The prism array 50 will be left, as shown in FIG. 3E, bonded to the release layer 64 while the tie coat adhesive 56 (not shown) remains with the removed top film 54 and optional outer film 52.

The resulting base face 51" of the prisms 58 has a concave surface, caused by shrinkage of the prism material during curing of the acrylated epoxy oligomer prism material and pulling down of the malleable top film 54 slightly into the prism volume.

Figure 4:
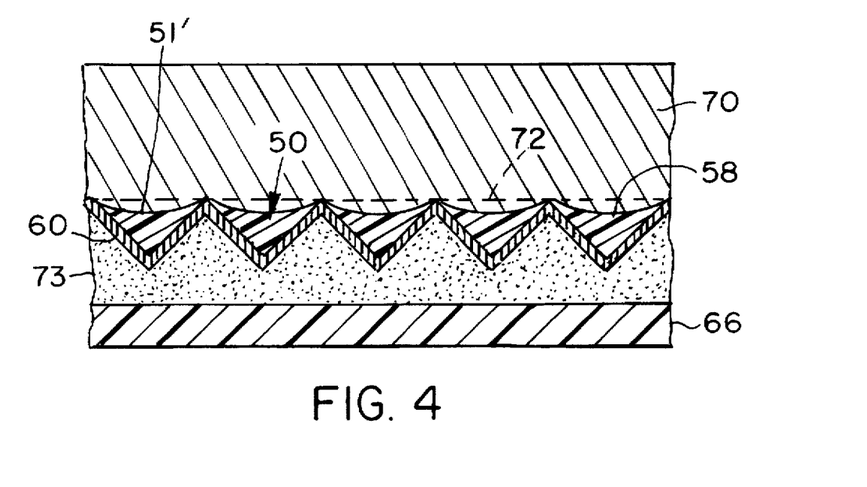
FIG. 4 is an enlarged cross-sectional view of a preferred embodiment of microprism retroreflective sheeting of the invention.

As shown in FIG. 4, the release layer 64 may then be removed from adhesive 62 and the prism array 50 attached by adhesive 62 to a permanent substrate, such as a vinyl or urethane panel or rain-ware gear 66 and a transparent protective cover layer 70 deposited, laminated or otherwise applied over the array 50.

Optionally, the transparent cover layer can be added as a coating or film bonded to the prism top faces prior to attaching the assembly to the final substrate.

Note: The degree of concavity of the prism top face is indicated by the dashed line 72 showing the original planar face 51.

The degree of concave curvature can be controlled by the hardness of the top film utilized. In the above example a 0.9 wave concave prism front face was created using a 0.006" thick vinyl film with a 66 hardness formed of 34% plasticizer and 66% PVC, carried by a 0.002" thick polyester film. If the hardness of the vinyl is adjusted to 75 (25% plasticizer, 75% PVC), the front face will be approximately 0.45 waves or 2,848 angstroms ($\lambda$=6328 Å) concave. Ideally, a concave curvature of approximately 1,000 angstroms is desired.

Figures 5, 6, 7, 8:
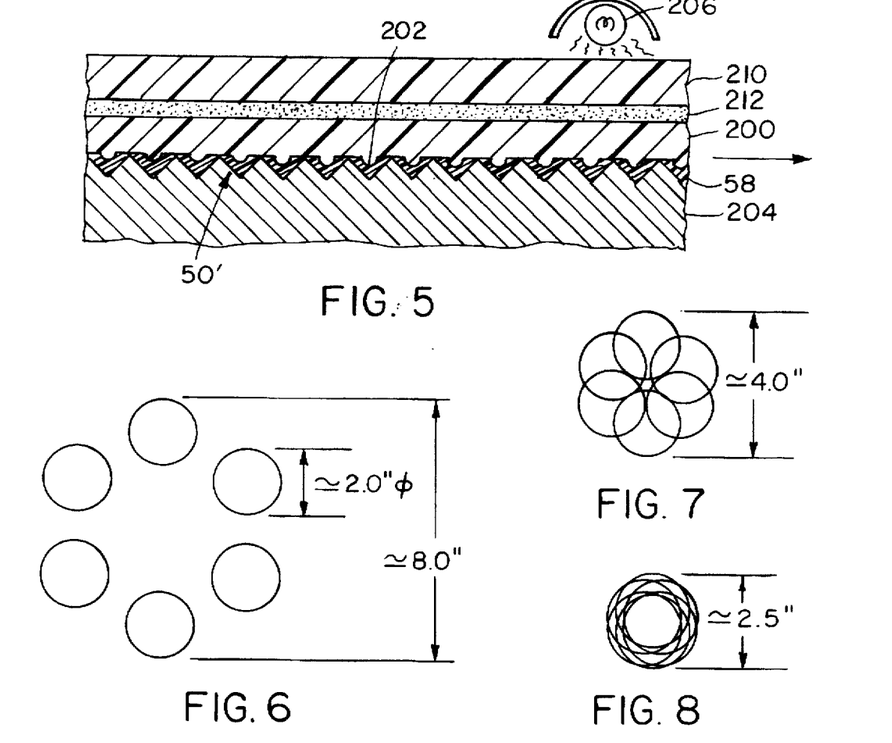
FIG. 5 is an enlarged cross-sectional view of an alternate preferred embodiment of microprism retroreflective sheeting of the invention.
FIG. 6 is a retroreflected energy pattern generated in accordance with an embodiment of the invention with prisms having a 0.9 peak to valley wavefront face curvature viewed at 15 feet and from a 0.0055 inch pitch prism array.
FIG. 7 is a retroreflected energy pattern generated in accordance with an embodiment of the invention with prisms having a 0.45 wave front face curvature viewed at 15 feet and from a 0.0055 inch pitch prism array.
FIG. 8 is a retroreflected energy pattern generated in accordance with an embodiment of the invention with prisms having a 0.16 wave front face curvature viewed at 15 feet and from a 0.0055 inch pitch prism array.

In an alternative embodiment as shown in FIG. 5, prisms 50" with curved top faces are formed as cast by utilizing a belt or platen 200 in place of the top film 54 of FIG. 3C. The belt is provided with randomly located micro convex or concave surfaces 202 on the belt face abutting the array of prisms 50" being cast in a mold on a drum as in FIGS. 3A, 3B. This belt or platen is laminated against the oligomer filled prism mold 204 as in FIG. 3B as the rollers (not shown) pass in the direction of the arrows. The oligomer is cured by UV radiation from source 206 causing concave or convex surfaces to be formed on the base surfaces of the prisms 50". The cast and cured prism array is then removed from the mold 204 with belt 200 attached thereto by a preferential adhesive (not shown) which was previously applied to the belt 200 on the surface abutting the prism top face. An optional carrier film 210 is adhered to belt 200 by release layer 212 which may be removed leaving the belt 200 attached to the array of prisms 50. As in FIG. 3D; the exposed prism facets are coated with a reflective material and a temporary release layer applied thereto by an adhesive not shown. The belt 200 may then be peeled away from the prism array leaving a reflective prism array with arcuate base faces attached to a release layer similar to the structure shown in FIG. 3E.

Some of the randomly positioned lens surfaces may not align with the center of the prisms' effective apertures, but sufficient numbers should do so to create the desired light distribution improvement.

Without base face curvature, the diffraction pattern at 15 feet from a 0.0055 inch pitch prism will be as shown in FIG. 2, except that the curvature maximum will be larger in diameter than the surrounding maximums.

With a 0.9 wave base face curvature in accordance with the invention and a 0.0055 inch pitch size prism, the diffraction pattern at 15 feet for an array formed as in FIGS. 3A-3E will be as shown in FIG. 6. Note that the central maximum in FIG. 4 has become six spread maxima in FIG. 6.

With a 0.45 wave base face curvature on the same size prism, the diffraction pattern is as shown in FIG. 7.

With a 0.16 wave base face curvature on the same size prism, the diffraction pattern will be near ideal and is shown in FIG. 8.

Note how the spread in the central maxima in six directions has enlarged the light distribution to form a near Gaussian distribution of the diffracted light.

A greater curvature of the prism base face can be allowed if the prism is to be over coated with a protective film, such as film 70 in FIG. 4, which has an index of refraction different from the index of the prisms. For example, if the over coat film 70 has an index of refraction of 1.58, and the prisms 58 have an index of refraction of 1.53, the curvature of the prism face will need to be about 0.48 waves or 3,000 angstroms to achieve the ideal retroreflected light distribution.

Figure 9:
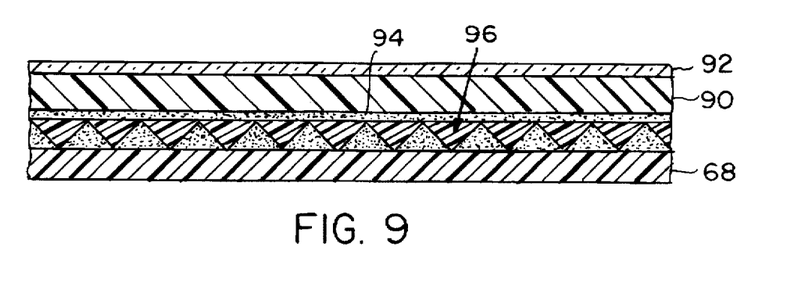
FIG. 9 is a fragmentary sectional view of a step in forming an embossing tool for making an array of prisms with a predetermined front face curvature.
Figure 10:
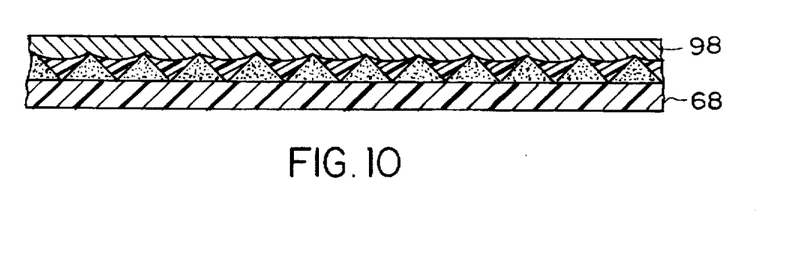
FIG. 10 is a fragmentary sectional view of another step in forming an embossing tool for making an array of prisms with a predetermined front face curvature.

A coating or an embossing roll to apply the correct lenslet surface to the top film can be made using the following method as shown in FIGS. 9 and 10.

First: The exposed prism concave top faces are formed as described above by utilizing a vinyl film 90 carried on a polyester film 92 and adhered by tie-coating adhesive 94 to an array of corner-cube microprisms 96. The microprism side of the assembly is bonded to a rigid plastic plate 68 (FIG. 9). Next the top film is stripped off to expose the resulting concave top face of the prism (FIG. 10). The hardness of the vinyl 90 is selected to achieve the desired amount of concave curvature on the prism top face.

Second: A conductive coating 98, such as Al, Ag, Au, Ni, is bonded to the concave top faces of the prisms. An electroform replica is made of the microconcave surfaces that may be used to coat onto or emboss the pattern into films. The tool created in this step may be used to emboss thermoplastic pieces creating the pattern. A number of embossed plastic pieces or electroformed pieces are assembled together to create a large part to electroform a large tool or create a surface that can be wrapped around an embossing or coating drum.

In the first step above the original film could be bonded to an elastomeric mounting surface and after the vinyl and polyester films are removed, the elastomeric film could be formed around a mandrel and used to electroform a cylinder with the micro surface pattern on the inside of the cylinder. The cylinder could then be used to electroform a final coating or embossing roll. The elastomeric film could be stretched when applied to the mandrel in the first step to create spacing between the concave top faces of the prisms. In this case the adhesive used would need to be inert to the metalizing process required to form the conductive coating prior to electroforming.

Another way to create the spacing or random spacing is to selectively (pattern) coat an oligomer on the concave bases of the prism faces, filling some of the prism faces and leaving some open (with a concave surface). Then metallize and follow with electro-forming a metal mold, and finally creating an embossing drum.

Figure 11:
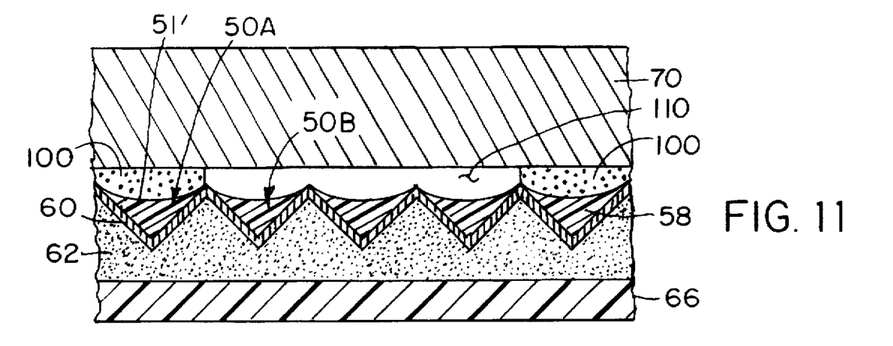
FIG. 11 is an enlarged fragmentary sectional view of a second alternate embodiment of the invention.

In another alternative (as shown in FIG. 11), the transparent cover layer can be modified to be adhered by a patterned adhesive 100. The prisms 50A that intersect with the adhesive 100 are wetted out by the adhesive and will retroreflect like normal because the curvature of the prism base faces is eliminated and replaced by the material of the adhesive which has the same index of refraction as the prisms. The index of refraction of the adhesive is within 0.5% of the index of refraction of the prisms. The prisms 50B left with the front face exposed to air 110 will retroreflect at a wider observation angle as a result of the top face curvature. The resulting retroreflected light distribution will be a combination of FIG. 2 and FIGS. 6, 7 and 8.

As a further alternative, the top film or coating 302 (FIG. 13) may be loaded with UV light absorbers to extend the useful outdoor life of the product by reducing the deleterious effects of UV light on the underlying retroreflective materials. An example of such a vinyl film is Renolit H068 UV film. Heretofore such absorbers were added by an additional film or coating 4 (as in FIG. 1) applied at the final stages of assembly. By incorporating the UV absorbers in the top film 302, the additional step and thickness of the prior art film or coating 4 (FIG. 1) is obviated. Theoretically, by this method a retroreflective product 310 that is only 0.003 inch thick can be produced as compared to prior art products that range from 0.006 to 0.015 inch thick. Additionally, before applying the top film, a white crosshatch width 300 of material, such as a white aliphatic urethane (the whiteness achieved by TiO$_2$ additive), can be formed over portions of the curved prism top faces 51 as shown in FIG. 15 to enhance the whiteness or CAP Y of the sheeting.

Figure 13:
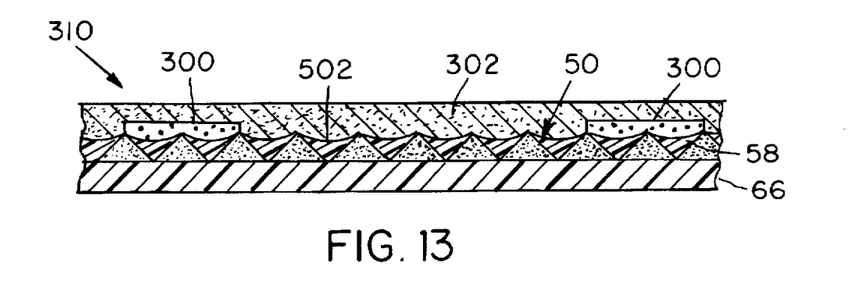
FIG. 13 is a fragmentary sectional view of a fourth alternate embodiment of the invention.
Figure 14:
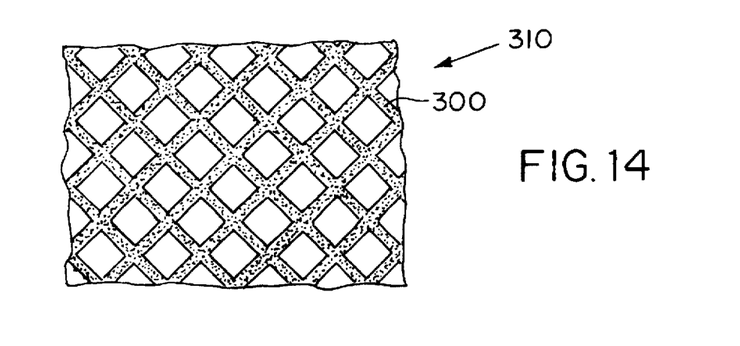
FIG. 14 is a plan view of the embodiment of FIG. 13.

The top film 302 then can be bonded onto the pattern 300 and the remaining exposed prism top faces with an adhesive (not shown) that fully covers the surface or with a pattern of adhesive (not shown) that leaves some of the prism top faces 302 exposed to an air boundary between the prism top face 502 and the top film 302.

In a further embodiment (not shown), a top film 302 that has a variation in index of refraction from point to point may be employed. The variation in the index of refraction will cause the retroreflected light to be spread by differing amounts dependent on the index variation magnitude.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

For example, while the invention has so far been described in connection with a concave curvature base face and metallic coated reflective prisms, other curvature shapes are contemplated for producing different optical effects, such as, convex, or prismatic base faces which could be made by embossing a shape or texture into the top film, prior to casting the prisms.

Suitable alternative top films with appropriate hardness and malleability may include, for example, not only vinyl, but also urethane, polyethylene or polypropylene. Likewise, appropriate prism material includes not only acrylic epoxy, but also may comprise any light transparent polymer in which the hardness can be varied, such as vinyls urethanes, polypropylenes and polyethylenes. A preferred temperature range for curing acrylic epoxy with UV light is 40° C. to 80° C., dependent on processing speeds.

The present invention is applicable to microprism sheeting in which the center to center spacing of the prisms is about 0.0005 inch to 0.025 inch, and preferably 0.003 inch to 0.008 inch. As will be appreciated, the height of the prisms will be dictated by the center to center spacing since the prisms are typically orthogonal.

The prism side faces are conventionally all provided with a planar configuration. However, an arcuate configuration on all faces will produce a beneficial result with even greater uniformity.

The prisms may also be tilted at a tilt angle (angle between the prism axis and optical axis). The tilt should be within the range of 1°–10°, and is preferably 3°–8°.

Lastly, some non-orthogonality in the intersections of the prism faces may be tolerated, but should be limited to a deviation of 0.2° and is preferably about 0.1°.

The body portion of the sheeting will generally have a thickness sufficient to provide structural integrity for the sheeting, i.e., at least 0.005 inch. Generally, it will fall within the range of 0.002–0.1 inch. If so desired, it may comprise a laminate of two or more layers depending upon the method of fabrication, the resins selected, and other characteristics desired for the retroreflective sheeting.

The microprism sheeting is conveniently formed by casting prisms upon a film surface functioning as the body, or by embossing a preformed sheet, or by casting both body and prisms concurrently. Generally, the resins employed for such cast microprism sheeting are cross-linkable thermoset formulations, and desirably these resins provide flexibility, light stability, and good weathering characteristics. In some instances, the front face of the retroreflective sheeting may be provided with a protective coating such as by application of a lacquer or other coating material. Other suitable resins for the retroreflective sheeting include vinyl chloride polymers, polyesters, polycarbonates, methyl methacrylate polymers, polyurethanes and acrylated urethanes.

To protect a relatively thin body member during processing, a relatively rigid carrier may be temporarily bonded thereto, and it will generally have a thickness of 0.001 inch to 0.004 inch. The adhesive used to effect the temporary bonding and which preferentially adheres to the carrier is conveniently a silicone adhesive applied to a thickness of about 0.00025 to 0.0005 inch. When ultraviolet curing of the resin in the prisms is employed (as preferred herein), the adhesive must be transparent to the light rays. Although various resins may be employed for such a carrier, polyesters, and particularly polyethylene terephthalate, are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

A particularly advantageous method for making such cast retroreflective sheeting is described and claimed in previously cited U.S. Pat. No. 3,689,346 granted Sep. 5, 1972 to W. P. Rowland in which the cube corner formations are cast in a cooperatively configured mold providing microprism recesses and are bonded to sheeting which is applied thereover to provide a composite structure in which the cube corner formations project from the one surface of the sheeting.

Another method for fabricating such microprism sheeting is described in Rowland U.S. Pat. No. 4,244,683 granted Jan. 13, 1981 (also incorporated herein it its entirety by reference) in which the cube corner formations are produced by embossing a length of sheeting in suitable embossing apparatus with molds having precisely formed microprism cavities and in a manner which effectively avoids entrapment of air.

The latter method has been used for forming sheeting of acrylic and polycarbonate resins while the former method has proven highly advantageous for forming retroreflective sheeting from polyvinyl chloride resins and, more recently, polyester body members with prisms of various resin formulations including acrylated epoxy oligomers.

It is customary to provide a backing sheet behind the microprisms so as to protect them and to provide a smooth surface for application of the structure to support surfaces. To effect lamination of such a backing sheet to the retroreflective sheeting, adhesives, ultrasonic and radio frequency welding have generally been employed.

As previously described, the reflective interface for the prisms may be provided by a reflective coating or by an air interface. In the preferred embodiment of the present invention, a reflective coating is provided upon the surfaces of the microprisms, and such reflective coatings have most commonly been vacuum metallized aluminum or other specular metal deposits, although metallic lacquers and other specular coating materials have also been used.

A colored coating material may be provided over some of the prisms to provide a daytime coloration. Such a material may be colored lacquer applied to the surface of the sheeting, a colored adhesive, or any other colored deposit which will coat the prism surfaces. Conveniently, a colored adhesive is employed since this will enable bonding of the backing material there to.

A retroreflective material utilizing some prisms which have reflective air interfaces and others which utilize a reflective coating offers some advantages and is described in detail in Martin U.S. Pat. No. 4,801,193 granted Jan. 31, 1989 (the teachings of which are incorporated in their entirety by reference). If so desired, retroreflective sheeting may be produced by applying the backing material to a partially metallized material so as to maintain the air interface in the uncoated areas.

To produce a sheeting which exhibits a daytime coloration, a colored coating may be applied over the entire area of a partially metalized surface so that it directly coats the unmetallized prisms. Thereafter, the backing material is applied. In an alternate colored embodiment using an air interface for retroreflection, a colored adhesive is applied in a pattern to the prism surface and to a depth greater than the height of the prisms. When the backing element is laminated thereto, it is spaced from the prisms by the adhesive and this provides an air interface about the uncoated prisms.

The backing material may be any suitable material. For flexibility, it should comprise a woven or laid fabric, or a flexible, durable polymeric material. Suitable resins include polyethylene, polypropylene, polyurethanes, acrylated polyurethanes, polyvinylchloride and ethylene/vinyl acetate copolymers. Polyester and urethane fabrics may be employed as well as those of natural fibers such as cotton. Flame retardants may be incorporated in the adhesives as well as in the fabric or resin backing to impart flame retardance to the retroreflective material.

Although other metals may be used to provide a specular metal deposit including silver, rhodium, copper, gold, tin, zinc and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ radio frequency or ultrasonic welding and other techniques to bond the backing material to the retroreflective sheeting by the material of the backing material itself when it is thermoplastic.

To provide a coloration to the retroreflective panel at night, a dye may be incorporated in the resin used to form the body member, and even the prisms. As an alternative to a dye and as an effective necessity in some resin systems, the coloration may be provided as a finely divided pigment which is well dispersed; however, some loss in retroreflectivity will occur as the result of refraction by pigment particles which are directly in the path of light rays.

An air interface may be used in place of the reflective coating 60 if the array is interconnected at the prism edges and an adhesive pattern is used to hold the structure down as the top film 54 is removed.

Figure 12:
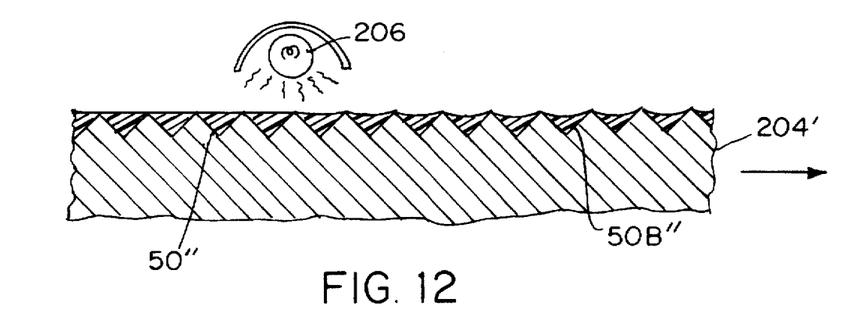
FIG. 12 is a fragmentary sectional view of a third alternate embodiment of the invention.

In the embodiment of FIG. 12, the heat shrinkable prism mold material is directly cured in the mold as the mold 204 is removed relative to the heat source 206 producing cured prisms 50B" with curved base surfaces from uncurved and uncured prisms 50". An array of such prisms may then be attached to suitable sheeting in the well known manner.

Thus, it can be seen from the foregoing detailed description and attached drawings that the present invention provides a retroreflective microprism material which exhibits a desirably controlled spread of the retroreflected light energy within a narrow cone and which is operative to retroreflect light impinging thereon at an entrance angle which deviates from normal. The retroreflected light energy is thus concentrated and reasonably uniformly dispersed about a reasonably narrow divergent cone to facilitate viewing by persons displaced from the illuminating light source.

Having thus described the invention, what is claimed is:

1. A method of forming an array of microprism retroreflective material comprising the steps of:

a) forming an array of heat shrinkable transparent prisms in a mold, the prisms having a planar base face and side faces extending therefrom to an apex;

b) bonding the array to a plastic film with the base faces abutting the film;

c) curing the array to shrink the prisms and causing the base face to curve inwardly and portions of the film to move into a space left as the base face curves inwardly;

d) removing the film, leaving an array of micro prisms with curved base faces; and e) forming a reflective interface on the said side faces.

2. The method of claim 1 wherein a protective layer is formed over the array of prisms.

3. The method of claim 2 wherein the protective layer is bonded by a transparent adhesive to some of the curved base faces and not to others leaving an air interface between the non-bonded prism base faces whereby the non-bonded prisms will retroreflect at a wider observation angle than the bonded prisms as a result of the curvature in the base faces.

4. The method of claim 2 wherein an index of refraction of the protective layer differs from that of the prisms.

5. The method of claim 1 wherein the curvature of the base faces is about 0.16 times a wave front of 632.8 nm light.

6. The method of claim 1 wherein the plastic film is formed of vinyl having a hardness in the range of 66% to 95%.

7. The method of claim 6 wherein the plastic film is formed of a mixture of plasticizer and vinyl.

8. The method of claim 7 wherein the prisms are formed of an epoxy.

9. A highway sign having a sheet of material formed in accordance with the method of claim 1.

10. A garment having a retroreflective tape formed of the material formed in accordance with the method of claim 1.

11. An embossing tool formed in accordance with the method of claim 1.

12. The method of claim 1 wherein the array is bonded to the plastic film by a radiation cured transparent adhesive.

13. The method of claim 12 wherein the curing is provided by a source of radiation which cures the adhesive.

14. The method of claim 13 wherein the source is a UV source.

15. A method of forming retroreflective sheeting comprising the steps of:

a) forming a mold comprised of a first array of solid prisms with sides intersecting at an apex, which apex points outwardly from the mold leaving an array of prism cavities formed therein with a base side and apices extending from the base side and pointed inwardly of the mold;

b) dispensing a light transparent curable oligomer into the cavities;

c) applying a planar sheet having a random series of arcuate surfaces formed on a side thereof to the base side of said array;

d) curing said oligomer while the sheet is applied so as to form a second array of light transparent prisms with a base side in which said arcuate surfaces are formed therein; and e) removing said sheet with the second array attached thereto to form said sheeting.

16. The method of claim 15 wherein the oligomer is a UV curable material and the planar sheet is transparent to UV light.

17. The method of claim 16 wherein the sheet is formed of a high temperature thermoplastic.

18. The method of claim 2 wherein the protective layer is uniformly bonded to all the base faces by a transparent adhesive.

* * * * *